(12) United States Patent
Suga et al.

(10) Patent No.: US 12,584,370 B2
(45) Date of Patent: Mar. 24, 2026

(54) MOLDED PRODUCT AND PROCESSED ARTICLE

(71) Applicant: Kureha Corporation, Tokyo (JP)

(72) Inventors: Takahiro Suga, Tokyo (JP); Takuma Kobayashi, Tokyo (JP); Kiyomi Ohuchi, Tokyo (JP); Yoshinori Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 260 days.

(21) Appl. No.: 18/552,344

(22) PCT Filed: Mar. 24, 2022

(86) PCT No.: PCT/JP2022/013866
§ 371 (c)(1),
(2) Date: Sep. 25, 2023

(87) PCT Pub. No.: WO2022/210240
PCT Pub. Date: Oct. 6, 2022

(65) Prior Publication Data
US 2024/0035352 A1 Feb. 1, 2024

(30) Foreign Application Priority Data
Mar. 31, 2021 (JP) ................................. 2021-061779

(51) Int. Cl.
*E21B 33/12* (2006.01)
*B29C 70/00* (2006.01)
(Continued)

(52) U.S. Cl.
CPC ........ *E21B 33/1208* (2013.01); *B29C 70/003* (2021.05); *B29C 70/14* (2013.01);
(Continued)

(58) Field of Classification Search
CPC ... B32B 1/00; E21B 33/1208; E21B 2200/08; E21B 33/00; B29C 48/00; B29C 70/00;
(Continued)

(56) References Cited

U.S. PATENT DOCUMENTS 2,742,931 A * 4/1956 Name not available ...................
F16L 11/083
156/181
4,057,610 A * 11/1977 Goettler .................. F16L 11/08
264/108
(Continued)

FOREIGN PATENT DOCUMENTS

CA 3051735 A1 * 2/2020 .............. C08L 75/04
CN 107903599 A 4/2018
(Continued)

OTHER PUBLICATIONS

European Communication pursuant to Article 94(3) EPC for European Application No. 22780454.9, dated Jan. 22, 2025.
(Continued)

*Primary Examiner* — Jennifer A Steele
(74) *Attorney, Agent, or Firm* — Birch, Stewart, Kolasch & Birch, LLP

(57) ABSTRACT
Provided is a molded product having small anisotropy of strength in a MD direction and a TD direction and a processed article thereof. A molded product (10) includes a glycolic acid polymer and a plurality of fibers (11). The fibers (11) include the fibers oriented in the MD direction and the fibers oriented in a direction along a tangent line to concentric circles in a cross-section orthogonal to the MD direction at a specific ratio.

5 Claims, 8 Drawing Sheets

(51) Int. Cl.

| | |
|---|---|
| *B29C 70/14* | (2006.01) |
| *B29C 70/20* | (2006.01) |
| *B29C 70/54* | (2006.01) |
| *C08J 5/04* | (2006.01) |

(52) U.S. Cl.
CPC .......... *B29C 70/207* (2013.01); *B29C 70/545* (2013.01); *C08J 5/043* (2013.01); *B29C 2793/009* (2013.01); *C08J 2367/04* (2013.01)

(58) Field of Classification Search
CPC ................. Y10T 428/29; Y10T 428/13; Y10T 428/24994
See application file for complete search history.

(56) References Cited

U.S. PATENT DOCUMENTS

| | | | | |
|---|---|---|---|---|
| 9,574,418 | B2 | 2/2017 | Okura et al. | |
| 10,030,465 | B2 | 7/2018 | Okura et al. | |
| 10,711,561 | B2 | 7/2020 | Merron et al. | |
| 2015/0252646 | A1 | 9/2015 | Okura et al. | |
| 2015/0290858 | A1 | 10/2015 | Okura et al. | |
| 2015/0292292 | A1 | 10/2015 | Okura et al. | |
| 2016/0369154 | A1* | 12/2016 | Johnson | E21B 43/25 |
| 2017/0369708 | A1* | 12/2017 | Kokel | C08K 7/02 |
| 2018/0313184 | A1 | 11/2018 | Merron et al. | |
| 2019/0284351 | A1 | 9/2019 | Yaguchi et al. | |
| 2020/0207949 | A1 | 7/2020 | Kobayashi et al. | |
| 2021/0388154 | A1 | 12/2021 | Zhang | |

FOREIGN PATENT DOCUMENTS

| | | | |
|---|---|---|---|
| JP | 2008-138049 | A | 6/2008 |
| JP | 2013-112751 | A | 6/2013 |
| JP | 5673509 | B2 | 2/2015 |
| JP | 2019-060219 | A | 4/2019 |
| WO | 2014/010267 | A1 | 1/2014 |
| WO | 2014/077302 | A1 | 5/2014 |
| WO | 2014/092067 | A1 | 6/2014 |
| WO | 2020/087216 | A1 | 5/2020 |

OTHER PUBLICATIONS

Canadian Office Action for Canadian Application No. 3,213,356, dated Feb. 5, 2025.

Nomura, Kanno, Yamao et al., "Influence of Shape of Cross Section on Properties of GF Reinforced Thermo-Plastics", Journal of the Japan Society of Composite Materials, vol. 36, No. 6, 2010, pp. 230 to 236.

Consul et al., "Effect of Extrusion Parameters on Short Fiber Alignment in Fused Filament Fabrication," Polymers, vol. 13, 2021, pp. 1-24.

Extended European Search Report for European Application No. 22780454.9, dated Jul. 30, 2024.

International Preliminary Report on Patentability and English translation of the Written Opinion of the International Searching Authority for International Application No. PCT/JP2022/013866, dated Oct. 12, 2023.

* cited by examiner

[FIG. 1]
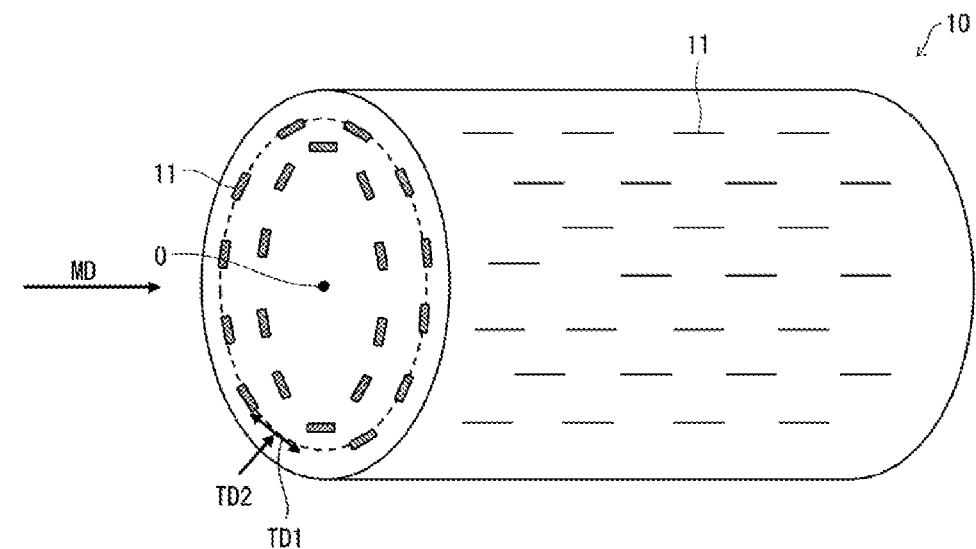
[FIG. 2]
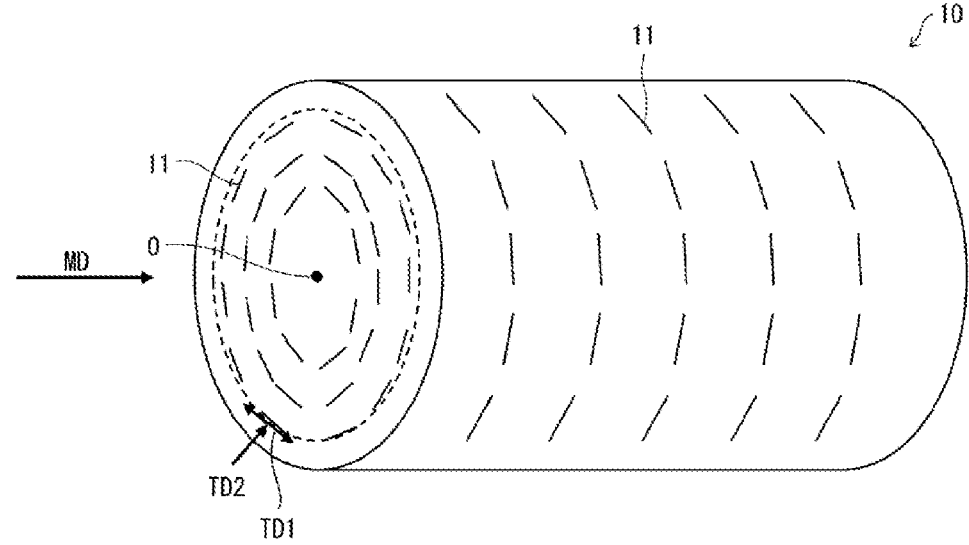

[FIG. 3]
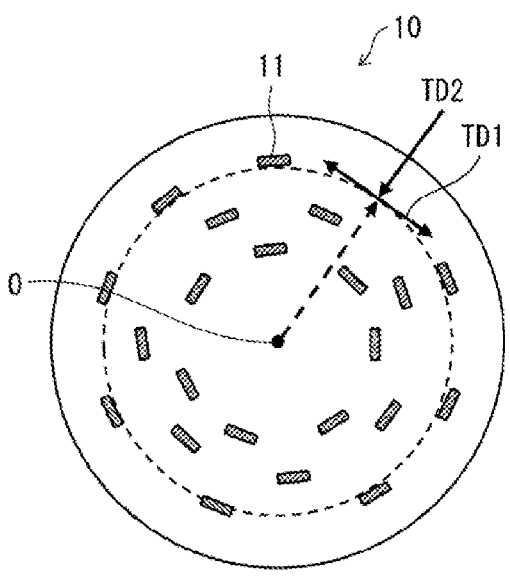
[FIG. 4]
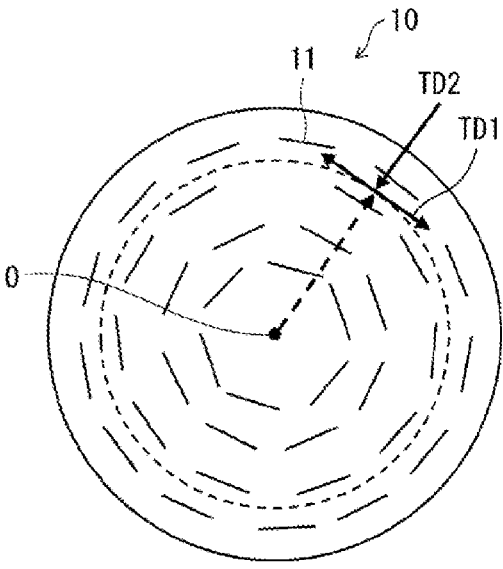

[FIG. 5]
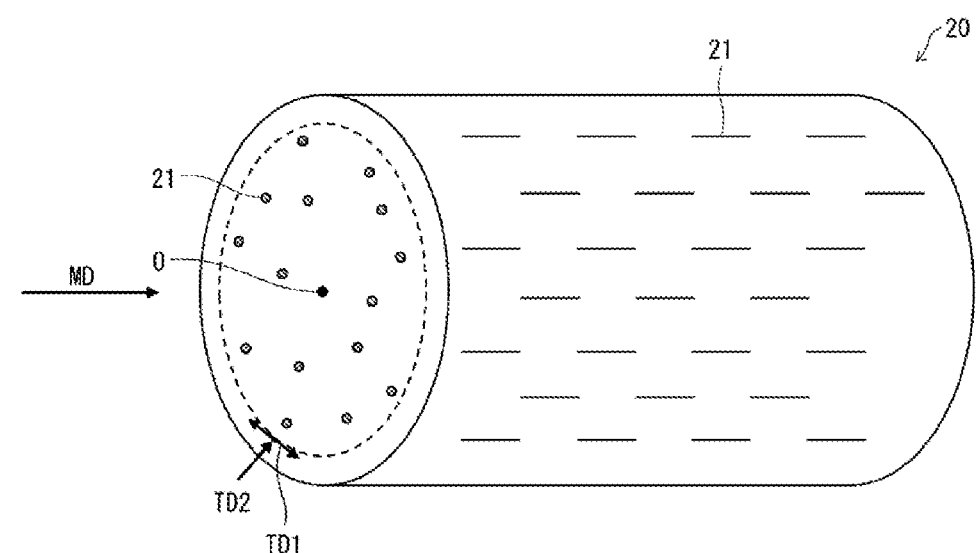
[FIG. 6]
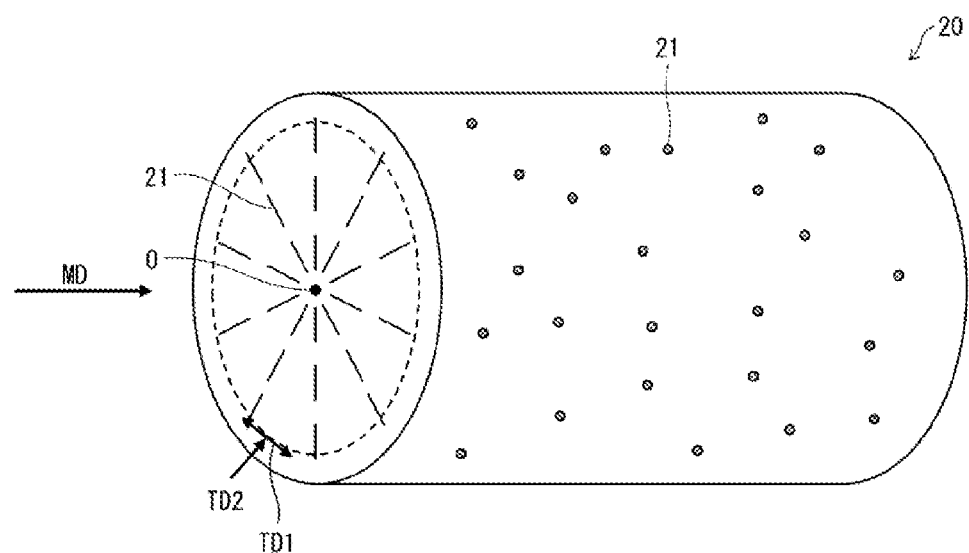

[FIG. 7]
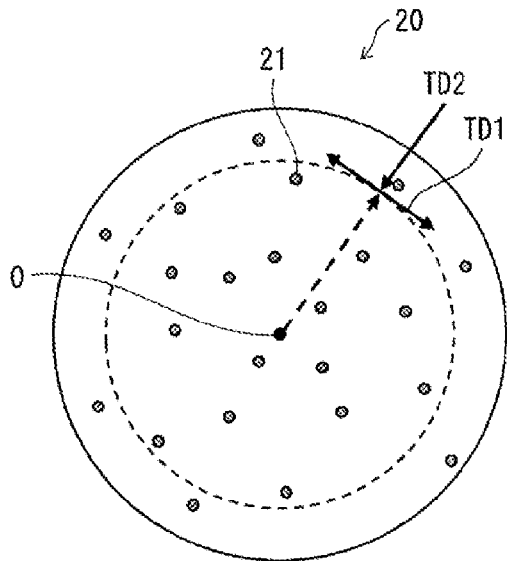
[FIG. 8]
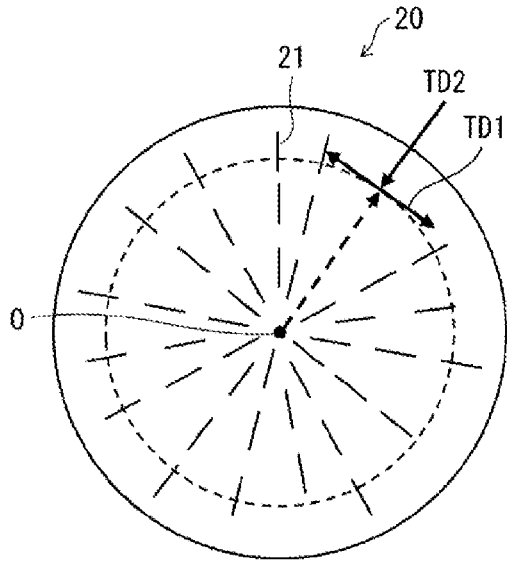

[FIG. 9]
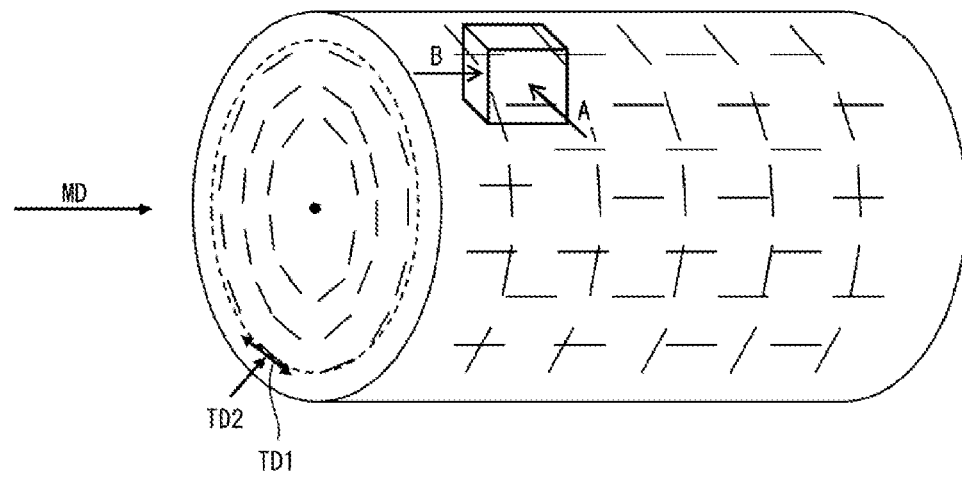
[FIG. 10]
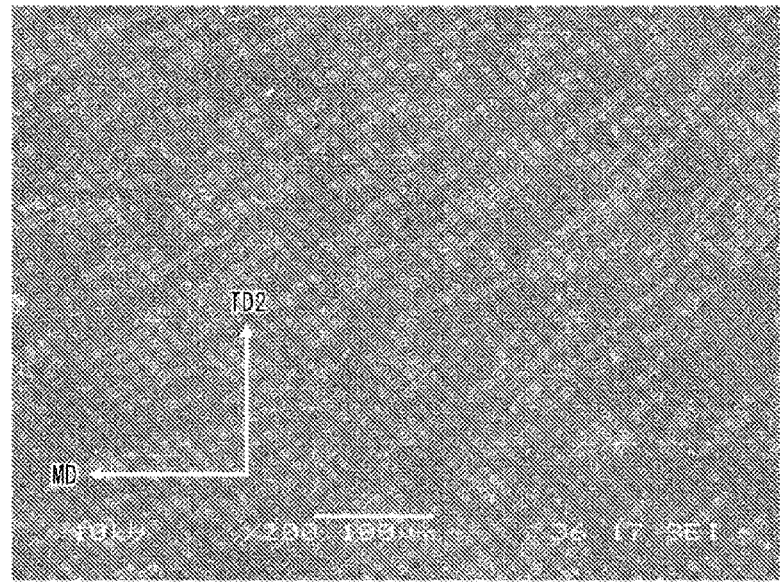

[FIG. 11]
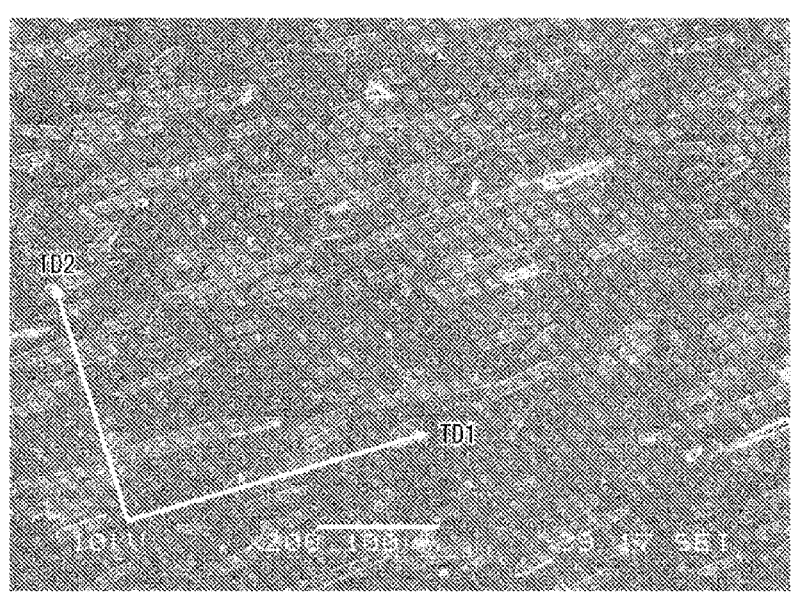
[FIG. 12]
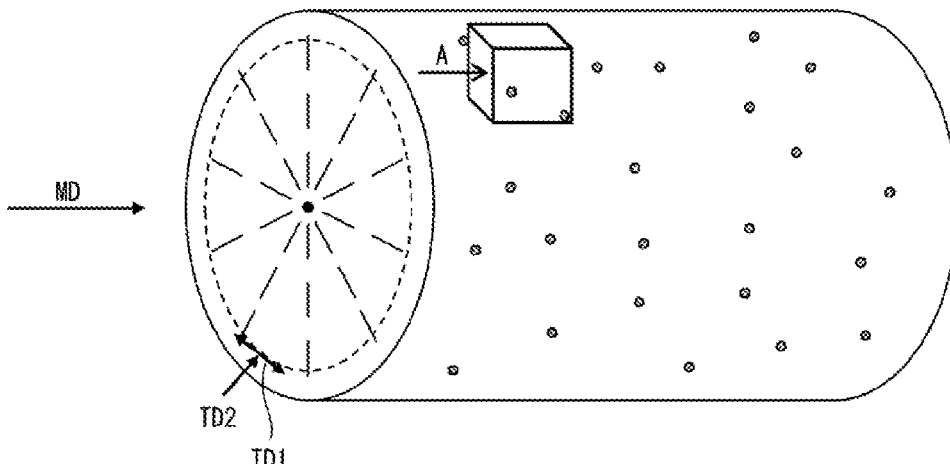

[FIG. 13]
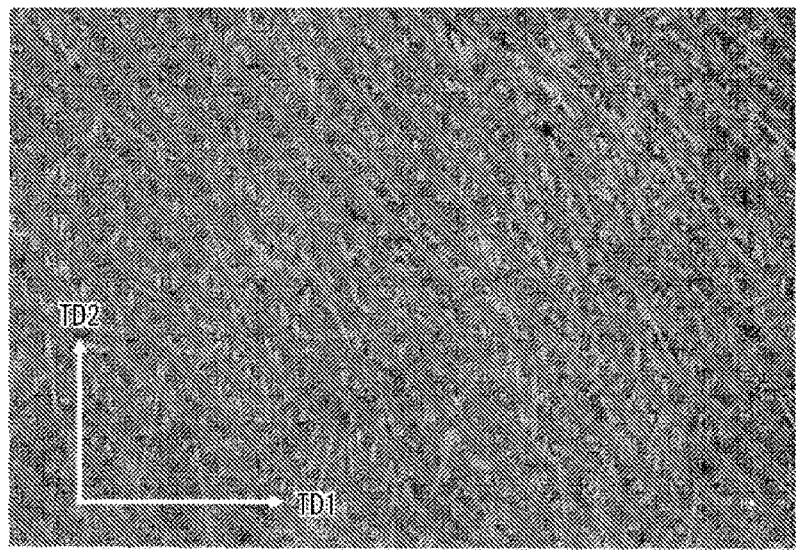
[FIG. 14]
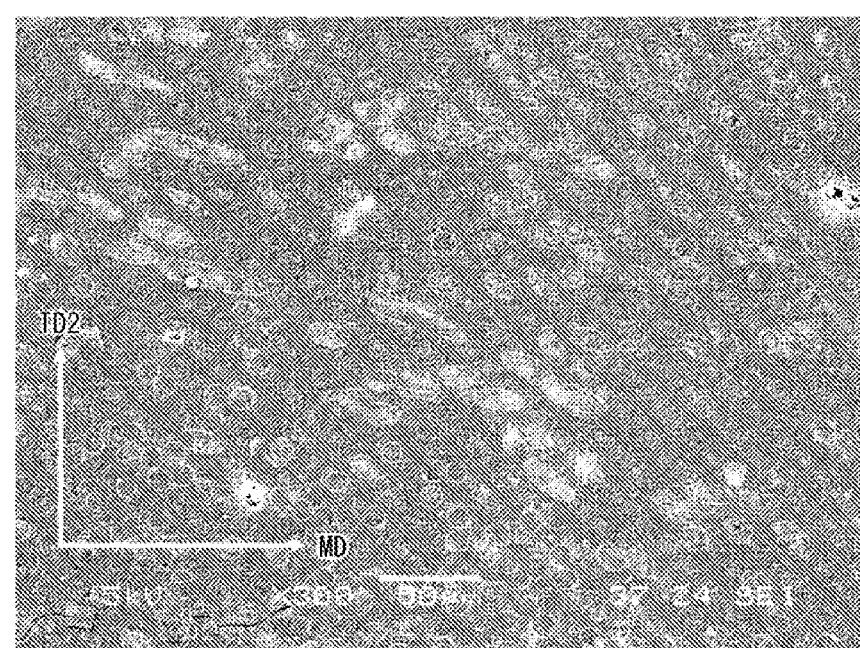

[FIG. 15]
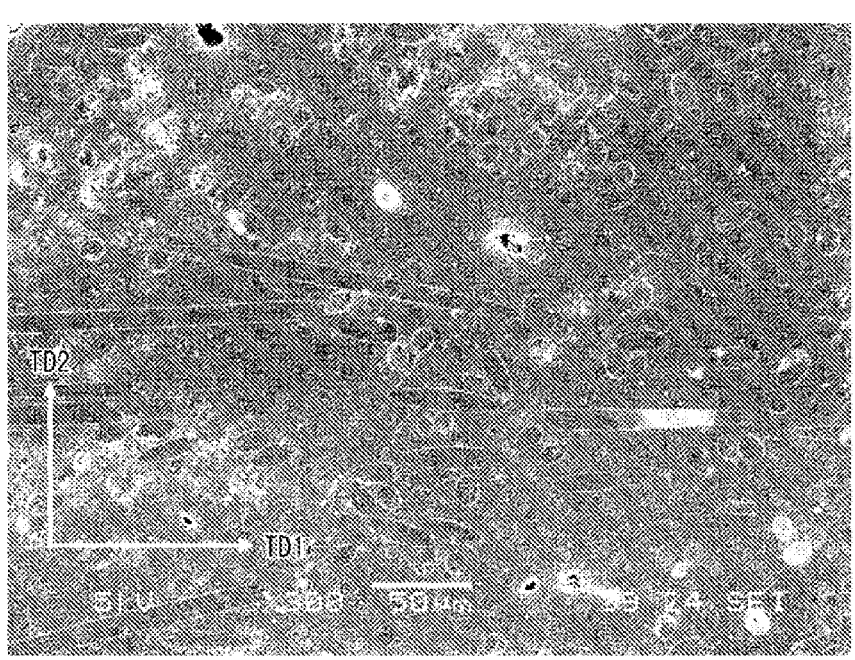

MOLDED PRODUCT AND PROCESSED ARTICLE

TECHNICAL FIELD

The present invention relates to a molded product and a processed article.

BACKGROUND ART

Polyglycolic acid (PGA) is hydrolyzable and can have high mechanical strength. For this reason, a molded product and a processed article of polyglycolic acid (PGA) are suitably used as a component for a downhole (underground borehole) tool for recovering hydrocarbon resources including oil and gas from the ground. It is known that a fiber filler such as glass fiber (GF) is added to a downhole tool component made of PGA from the viewpoint of enhancing the mechanical strength thereof (for example, refer to Patent Document 1).

Meanwhile, it is known that a plate-shaped resin molded product to which a flat fiber (FF), which is a fiber having a flat cross-sectional shape, is added is effective in reducing unevenness of shrinkage rates in a direction (MD direction) in which a resin flows during molding and in a direction (TD direction) perpendicular to the MD direction (refer to, for example, Non-Patent Document 1).

CITATION LIST

Patent Document

Patent Document 1: WO 2014/010267

Non-Patent Document

Non-Patent Document 1: Nomura, Kanno, Yamao et al., "Influence of Shape of Cross Section on Properties of GF Reinforced Thermo-Plastics", Journal of the Japan Society of Composite Materials, Vol. 36, No. 6, 2010, pp. 230 to 236.

SUMMARY OF INVENTION

Technical Problem

GF is sometimes used as a fiber filler in a molded product of PGA as a downhole tool component, and the cross-sectional shape of GF is usually circular. In this case, the difference between the strength in the MD direction and the strength in the TD direction of the molded product (also referred to as "anisotropy of strength") becomes large.

The downhole tool components are generally exposed to a high pressure environment in a wellbore. Therefore, in the case where the molded product of PGA is used as a downhole tool component, when the anisotropy of strength in the molded product of PGA is large, a three dimensionally complex force may act on the downhole tool component. Thus, the durability of the downhole tool component may be insufficient or a more elaborate and more complex design of the downhole tool component may be required.

An object of one aspect of the present invention is to provide a molded product having low anisotropy and a processed article thereof.

Solution to Problem

In order to solve the above problems, according to an aspect of the present invention, there is provided a molded product containing a glycolic acid polymer and a plurality of fibers, wherein the fibers include the fibers oriented in a first direction and the fibers oriented in a second direction along a tangent line to circumferences of a plurality of concentric circles having a common center in a cross-section orthogonal to the first direction, and a ratio of the number of the fibers oriented in the second direction to the number of the fibers oriented in the first direction is 0.2 to 5.0.

In order to solve the problem described above, a processed article according to an aspect of the present invention is a processed article produced by processing or molding the molded product described above.

Advantageous Effects of Invention

According to one aspect of the present invention, it is possible to provide a molded product having small anisotropy of strength and a processed article thereof.

BRIEF DESCRIPTION OF THE DRAWINGS

FIG. 1 is a diagram schematically illustrating an arrangement of fibers oriented in a first direction indicated by MD among fibers in a molded product according to an embodiment of the present invention.

FIG. 2 is a diagram schematically illustrating an arrangement of fibers oriented in a direction along a tangent line to a circumference of a plurality of concentric circles having a common center in a cross-section orthogonal to the MD direction indicated by TD1, among fibers in a molded product according to an embodiment of the present invention.

FIG. 3 is a diagram schematically illustrating an arrangement of fibers oriented in the MD direction in a cross-section orthogonal to the MD direction of the molded product according to an embodiment of the present invention.

FIG. 4 is a diagram schematically illustrating an arrangement of fibers oriented in the MD direction in a cross-section orthogonal to the TD1 direction of the molded product according to an embodiment of the present invention.

FIG. 5 is a diagram schematically illustrating an arrangement of fibers oriented in a first direction indicated by MD among fibers in a comparative molded product.

FIG. 6 is a diagram schematically illustrating an arrangement of fibers oriented toward one point in a cross-section orthogonal to the MD direction, indicated by TD2, among fibers in the comparative molded product.

FIG. 7 is a diagram schematically illustrating an arrangement of fibers oriented in the MD direction in a cross-section orthogonal to the MD direction of the comparative molded product.

FIG. 8 is a diagram schematically illustrating an arrangement of fibers oriented in the MD direction in a cross-section orthogonal to the TD2 direction of the comparative molded product.

FIG. 9 is a diagram for explaining orientation of a processed article with respect to the molded product in an example of the present invention.

FIG. 10 is an electron micrograph illustrating an example of a state of fibers when the processed article according to one example of the present invention is viewed along an arrow A in FIG. 9.

FIG. 11 is an electron micrograph illustrating an example of a state of fibers when the processed article according to one example of the present invention is viewed along an arrow B in FIG. 9.

FIG. 12 is a diagram for explaining the orientation of a processed article with respect to the molded product in a comparative example of the present invention.

FIG. 13 is an electron micrograph illustrating an example of a state of fibers when the processed article according to an comparative example of the present invention is viewed along the arrow A in FIG. 12.

FIG. 14 is an electron micrograph illustrating an example of a state of fibers when the processed article according to another example of the present invention is viewed along the arrow A in FIG. 9.

FIG. 15 is an electron micrograph illustrating an example of a state of fibers when the processed article according to another example of the present invention is viewed along the arrow B in FIG. 9.

DESCRIPTION OF EMBODIMENTS

Hereinafter, embodiments of the present invention will be described in detail. Note that, in the present specification, "to" means a numerical range including numerical values at both ends.

Molded Product

A molded product according to an embodiment of the present invention contains a glycolic acid polymer and a plurality of fibers.

Glycolic Acid Polymer

The glycolic acid polymer is a polymer compound containing a glycolic acid unit ($—OCH_2—CO—$) as a repeating unit. The glycolic acid polymer may be a glycolic acid homopolymer composed only of a glycolic acid unit (i.e., polyglycolic acid (PGA)) or may be a copolymer further containing a repeating unit derived from another monomer. Examples of other repeating units include hydroxyl carboxylic acid units such as lactic acid, and aliphatic polyesters such as polycaprolactone and polylactic acid. The content of those other repeating units in a glycolic acid polymer may be 50 mass % or less, preferably 30 mass % or less, and more preferably 10 mass % or less. By adopting those other repeating units, it is possible to adjust physical properties of the glycolic acid polymer, for example, a hydrolysis rate or crystallinity.

The molecular weight of the glycolic acid polymer may be appropriately determined depending on the intended use of the molded product and the processed article. For example, in the case where the molded product and processed article are to be used as a downhole tool component, when the molecular weight of the glycolic acid polymer is too low, the strength may be insufficient, and if it is too high, the molding processability may be insufficient. The molecular weight of the glycolic acid polymer is preferably 70000 or more, more preferably 100000 or more, and preferably 500000 or less in terms of weight-average molecular weight, from the viewpoint of exhibiting strength according to the intended use and achieving good molding processability.

The glycolic acid polymer can be produced by a known method. For example, the glycolic acid polymer can be suitably produced by subjecting glycolide, which is a dimer of glycolic acid, to ring-opening polymerization at about 120° C. to 250° C. in the presence of a small amount of a catalyst and in the substantial absence of a solvent (i.e., under bulk polymerization conditions).

Examples of such a catalyst include a cationic catalyst such as organic tin carboxylate, tin halide and antimony halide. The copolymer can be produced by the above-described method by using glycolide in combination with a comonomer. Examples of the comonomer include lactides and lactones, typified by lactide which is a dimer of lactic acid. Examples of lactones include caprolactone, β-propiolactone and β-butyrolactone.

Fiber

In an embodiment of the present invention, the fiber shape of the fiber can be represented by a ratio of a fiber length to a fiber diameter (major axis), which is an aspect ratio of the fiber shape. From the viewpoint of enhancing the strength of the molded product, the aspect ratio of the fiber shape in the fiber is preferably 2 or more, more preferably 3 or more, and still more preferably 4 or more. From the viewpoint of enhancing the dispersibility of the fibers in the molded product, the aspect ratio of the fiber shape in the fibers is preferably 1000 or less, more preferably 300 or less, and still more preferably 200 or less.

When the aspect ratio of the fiber shape in the fiber is increased, the initial decomposition rate in hydrolysis of the molded product or the processed article tends to be reduced.

The kind of the fiber can be appropriately selected depending on the use of the molded product and the processed article, and one or more kinds may be used. Examples of the fibers include inorganic fibers and organic fibers, more specifically, glass fibers, carbon fibers, boron fibers, aramid fibers, liquid crystal polymer fibers, and cellulose fibers such as kenaf fibers.

The content of the fiber in the molded product can be appropriately determined within a range in which the effect of the fiber is exhibited according to the use of the molded product and the processed article. For example, when the molded product and the processed article are used as a downhole tool component, the content of the fiber in the molded product is preferably 1 part by mass or more, more preferably 5 parts by mass or more, and still more preferably 10 parts by mass or more with respect to 100 parts by mass of the glycolic acid polymer. In addition, the content of the fibers in the molded product is preferably 50 parts by mass or less, more preferably 45 parts by mass or less, and still more preferably 40 parts by mass or less with respect to 100 parts by mass of the glycolic acid polymer in the case of the above-described use.

In an embodiment of the present invention, the cross-sectional shape of the fiber is not limited. The fiber preferably has a flat cross-sectional shape from the viewpoint of achieving the orientation of the fiber described later. The "flat cross-sectional shape" may be any shape as long as the fibers can exhibit the flow characteristics of the filler that is substantially plate-shaped in the molten resin.

The flat cross-sectional shape can be represented by a ratio of a major axis to a minor axis of the cross-sectional shape (an aspect ratio of the cross-sectional shape). From the viewpoint of exhibiting the above flow characteristics, the aspect ratio of the cross-sectional shape of the fiber is preferably 1.5 or more, more preferably 2 or more, and still more preferably 4 or more. In addition, the aspect ratio of the cross-sectional shape of the fiber is preferably 1000 or less, and more preferably 100 or less from the viewpoint of deterioration of the dispersion state of the fiber in the molded product and a decrease in decomposition rate.

The aspect ratio of the cross-sectional shape of the fiber may be achieved from the cross-sectional shape of the fiber as it is, or may be achieved from an image obtained by performing processing for more simply representing the shape on the image of the fiber cross-section. The aspect ratio of the cross-sectional shape of a fiber is determined as the ratio of two adjacent sides of a rectangle circumscribing the fiber cross-section and having one or more external contact points on all sides, or the ratio of the long side to the short side in the case of a rectangle.

The diameter of the fiber having a flat cross-sectional shape is preferably 0.1 µm or more, more preferably 1 µm or more, and still more preferably 5 µm or more in terms of the major axis from the viewpoint of achieving an improvement in the strength of the molded product by the fiber. The diameter of the fiber having a flat cross-sectional shape is preferably 1000 µm or less, more preferably 100 µm or less, and still more preferably 50 µm or less in terms of the major axis from the viewpoint of exhibiting good moldability.

Orientation of Fibers

In an embodiment of the present invention, the fibers having a flat cross-sectional shape include fibers oriented in a first direction and fibers oriented in a second direction. The second direction can be determined by a relationship with the first direction, and is a direction along a tangent line to circumferences of a plurality of concentric circles having a common center when the molded product is viewed along the first direction, that is, in a cross-section orthogonal to the first direction.

Here, the concentric circle is a group of a plurality of circles having a common center, and the second direction is determined for each group of concentric circles. In an embodiment of the present invention, the molded product may include two or more groups of concentric circles, but preferably includes one group of concentric circles from the viewpoint of sufficiently exhibiting the intended strength of the fibers of the molded product.

In an embodiment of the present invention, the fibers may be substantially oriented in the first direction with respect to the first direction. For example, in the fibers oriented in the first direction, the inclination of the major axis of the fiber with respect to the first direction may be 30° or less. Similarly, the fiber may be substantially oriented in the second direction with respect to the second direction, and for example, the fiber oriented in the second direction may have an inclination of the major axis of the fiber with respect to the second direction of 30° or less. Here, the "major axis of the fiber" represents a dimension in the length direction of the fiber, and it is, for example, a straight line connecting both ends of the fiber.

The number of fibers oriented in the first direction, the second direction, and the direction to be described later can be confirmed from a molded product or a processed article by industrial X-ray computed tomography, and by using an information processing technique related to fibers in an image, as necessary. In addition, since the first direction may be a feeding direction of the resin material during molding of the molded product, the first direction can be confirmed by observation of a cross-section along MD of the molded product, and the second direction can be confirmed by observation of a cross-section along TD of the molded product. Here, the feeding direction of the resin material is a direction in which the resin flows when the heated and melted resin is injected into a mold. For example, when the major axis of the fiber cross-sectional shape on an observation surface is less than twice the major axis of the actual fiber cross-sectional shape, the fiber is counted as a fiber oriented perpendicularly to the observation surface. Further, when the major axis of the fiber cross-sectional shape on the observation surface is twice or more the major axis of the actual fiber cross-sectional shape, the fiber is counted as a fiber oriented parallel to the observation surface. Furthermore, the first direction and the second direction can be confirmed by observing the cross-section at various angles of the molded product or the processed article.

In addition, when the number of fibers is counted by observing the cross-section of the molded product in the present specification, the number of fibers oriented perpendicular to the observation surface is 6.46 times as many as the number of fibers oriented parallel to the observation surface. Therefore, when the number of fibers is counted by observing the fibers in the first direction and the second direction with a microscope, the number of cross-sections of the fibers actually counted on the observation surface is corrected by 6.46 times to specify the number of fibers oriented in the first direction and the second direction. That is, in the present specification, the number of fibers oriented substantially parallel to a certain observation surface is a value obtained by multiplying an actually measured value counted in the observation surface by 6.46.

In an embodiment of the present invention, the ratio of the number of fibers oriented in the second direction to the number of fibers oriented in the first direction is 0.2 to 5.0 in one concentric circle group having a common center. The ratio of the number of fibers is preferably 1.0 to 3.0, and more preferably 1.0 to 2.0 from the viewpoint of further reducing the anisotropy of strength.

In an embodiment of the present invention, it is preferable that the ratio of the sum of the number of fibers oriented in the first direction and the number of fibers oriented in the second direction to the total number of fibers is 0.5 or more. The ratio of the total number of the fibers oriented to the total number of fibers is preferably larger from the viewpoint of further enhancing the strength of the molded product in a relationship in which anisotropy is reduced. Alternatively, from the same viewpoint, the mass of the fibers oriented in the first direction and the mass of the fibers oriented in the second direction are preferably 10 parts by mass or more with respect to 100 parts by mass of the glycolic acid polymer.

Preferred Embodiment of Molded Product

In an embodiment of the present invention, the shape of the molded product is not limited and can be determined as appropriate. The above-described orientation of the fibers can be achieved by the flow of the resin material during molding of the molded product. Therefore, the shape of the molded product is preferably a shape formed by flowing the resin material over a distance sufficient for the orientation of the fibers.

From such a viewpoint, the shape of the molded product is preferably an elongated shape having a sufficiently large length with respect to the dimension of the cross-section, and more specifically it is preferably a cylinder. In this case, it is preferable that the resin material is supplied from one end of a cylinder in the longitudinal direction of the cylinder at the time of molding from the viewpoint of realizing the orientation of the fibers in the two directions described above. Therefore, the first direction is preferably a direction along the central axis of the cylinder. In addition, from the viewpoint of sufficiently exhibiting the effect of relaxing the anisotropy of strength in all the TD directions with respect to the MD direction, it is preferable that the concentric circles have a common center in a central part of the cross-section of the cylinder of the molded product.

Other Raw Materials

In an embodiment of the present invention, the molded product may further contain a material other than the glycolic acid polymer and the fiber having a flat cross-sectional shape described above as long as the effect of an embodiment of the present invention can be achieved. The other materials may be used alone or in combination of two or more, and may be used in such an amount that the effect of the other materials can be further exhibited.

For example, the molded product may further contain a thermoplastic resin other than the glycolic acid polymer. By adding other thermoplastic resins, it is possible to control the hydrolyzability of the molded product. Examples of other thermoplastic resins include aliphatic polyesters other than the glycolic acid polymer, aromatic polyesters, polyacrylic acid core-shell rubbers, and elastomers.

The content of the other thermoplastic resins in the molded product is preferably less than 30 mass %, more preferably less than 20 mass %, and still more preferably less than 10 mass % from the viewpoint of sufficiently exhibiting the effect of the glycolic acid polymer.

The molded product may further contain a sizing agent for bundling the fibers. The sizing agent can be used from the viewpoint of improving the handleability of the fiber in the production of the molded product or from the viewpoint of improving the mechanical strength of the molded product.

Examples of the material constituting the sizing agent include an epoxy resin, a urethane resin, an acrylic resin, a silane coupling agent, and a vinyl acetate resin. Among them, an epoxy resin is preferable from the viewpoint of increasing the strength of the molded product. The amount of the sizing agent to be used is preferably 0.1 to 10.0 mass % and more preferably 0.3 to 5.0 mass % with respect to the total amount of the sizing agent and the fibers bundled therewith.

The molded product may further contain other fibers that do not have a flat cross-sectional shape. It can be used from the viewpoint of enhancing the mechanical strength of the molded product or adjusting the anisotropy of strength of the molded product. The anisotropy of strength in the molded product will be described in detail later. The other fibers can be selected from known fibers used for reinforcing resin compositions, and one or more kinds may be used. Examples of those other fibers include fibers having a substantially circular cross-section.

Further, the molded product may further contain an additive as long as the effect of an embodiment of the present invention can be achieved. The additive may be one or more kinds, and examples thereof include a heat stabilizer, a light stabilizer, a plasticizer, a moisture-proof agent, a waterproof agent, a water-repellent agent, a lubricant, an antioxidant, a decomposition accelerator, and a decomposition retarder.

Production Method

The molded product according to an embodiment of the present invention can be produced by mixing the glycolic acid polymer and the fibers, and molding the obtained resin material under the condition that the fibers are sufficiently fluidized so as to be oriented as described above in the continuous phase of the glycolic acid polymer during molding. From the viewpoint of orienting the fibers as described above, it is preferable to produce the molded product by a molding method in which the supply rate of the resin material during molding is sufficiently low. Examples of such a molding method include extrusion molding. The condition of the extrusion molding is presumed to enable to achieve the intended fiber orientation by slowing the extrusion rate, and it cannot be stated unconditionally, but it may be 50 to 150 mm/hour when fibers having a flat cross-sectional shape are used from the viewpoint of orienting a sufficient number of fibers in the second direction. In addition, from the viewpoint of orienting a sufficient number of fibers in the second direction, it is preferable to use fibers having a flat cross-sectional shape as the fibers in the production of the molded product. In addition, although it cannot be stated unconditionally, in the case of using fibers having a circular cross-sectional shape, the extrusion rate may be 50 to 120 mm/hour from the viewpoint of orienting a sufficient number of fibers in the second direction.

In addition, if the flow rate of the resin material during molding can be appropriately controlled in accordance with the shape of the molded product, the molded product in which the fibers are specifically oriented can be formed by a molding method other than extrusion molding, an example of which includes injection molding. In addition, a resin molded product in which fibers are oriented in a predetermined direction is filled in a mold so as to have a predetermined regularity and press-molded, and thereby, a molded product in which fibers are specifically oriented as described above can be formed.

Applications

The molded product according to an embodiment of the present invention exhibits biodegradability due to the glycolic acid polymer and mechanical strength with low anisotropy due to the fiber exhibiting a specific orientation, and thus is suitably used as a downhole tool component or a raw material thereof. The downhole tool component will be described later.

Processed Article

The processed article according to an embodiment of the present invention is a product produced by processing the molded product according to an embodiment of the present invention described above. Since the processed article of the present embodiment is obtained using the molded product as a raw material, the above-described characteristic orientation of the fibers is observed from the processed article.

The processed article according to an embodiment of the present invention can be produced by processing the molded product described above. Examples of the processing include cutting.

The processed article according to an embodiment of the present invention can also be produced by molding using the above-described molded product as a material. In the present specification, a processed article obtained by processing a molded product is also referred to as a "secondary molded product." The molding method for producing the secondary molded product may be any method as long as the above-described characteristic orientation of the fibers can be substantially maintained in the secondary molded product, and examples thereof include cutting. The processed article in an embodiment of the present invention may be a processed article of a secondary molded product.

The molded product may be a secondary molded product obtained by further molding the above-described molded product. The molding conditions for producing the secondary molded product can be appropriately determined within a range in which the above-described orientation of the fibers in the molded product can be substantially maintained. For example, in the case where the secondary molded product is produced by press-molding the molded product, the press-molding conditions cannot be generally defined, but may be conditions in which the molding pressing force is 50 kN or less from the viewpoint of substantially maintaining the orientation of the fibers in the molded product. In this case, in the secondary molding, an orientation of the above-described fibers is observed which substantially corresponds to the form of the initial molded product.

The production of the processed article may further include steps other than the molding or processing described above, so long as the effects of an embodiment of the present invention can be achieved. For example, in the production of a processed article, a heat treatment (annealing treatment) for relaxing stress of the workpiece after molding or processing may be further performed.

The processed article in an embodiment of the present invention is suitable for a downhole tool component. The downhole tool, as described above, is an instrument used for the recovery of hydrocarbon resources such as oil and gas from the ground. Examples of the downhole tool include a flack plug, a bridge plug, a cement retainer, a perforation gun, a ball sealer, a filler plug, and a packer.

The downhole tool is designed to be used for a predetermined period of time in a working environment aqueous medium at a predetermined temperature of, for example, from 20° C. to 180° C. for work such as molding, repairing, or enlarging a downhole, and then to be disintegrated and removed. During use of the downhole tool component according to an embodiment of the present invention, it is possible to increase the temperature of the environment surrounding the downhole tool component, for example, by injection of heated steam or the like, or by reducing the supply of working water for fracturing or the like. As a result, disintegration due to hydrolysis of the downhole tool component can be promoted.

Anisotropy of Strength

Hereinafter, the anisotropy of strength in an embodiment of the present invention will be described in more detail. FIG. 1 is a diagram schematically illustrating an arrangement of fibers oriented in the first direction indicated by MD among fibers in the molded product according to an embodiment of the present invention. FIG. 2 is a diagram schematically illustrating an arrangement of fibers oriented in a direction along a tangent line to a circumference of a plurality of concentric circles having a common center when viewed along the MD direction indicated by TD1, among fibers in the molded product according to an embodiment of the present invention. FIG. 3 is a diagram schematically illustrating the arrangement of fibers oriented in the MD direction in a cross-section orthogonal to the MD direction of the molded product according to an embodiment of the present invention. FIG. 4 is a diagram schematically illustrating the arrangement of fibers oriented in the MD direction in a cross-section orthogonal to a TD1 direction of the molded product according to an embodiment of the present invention.

As illustrated in FIGS. 1 to 4, a molded product 10 is a cylinder as an example, and fibers 11 are dispersed in a continuous phase of the glycolic acid polymer in a specific orientation. The fiber 11 is, for example, a fiber having a flat cross-sectional shape (for example, glass fiber). In FIG. 1, an arrow MD represents a feeding direction of the resin material at the time of molding the molded product 10, and arrows TD1 and TD2 represent directions orthogonal to the feeding direction. As described above, an arrow TD1 indicates a direction along a tangent line to a circumference of a plurality of concentric circles having a common center when viewed along the MD direction. An arrow TD2 indicates a direction orthogonal to both the MD direction and the TD1 direction. The molded product 10 is produced by extrusion molding, for example. The "feeding direction of the resin material during molding of the molded product 10" can be determined by observing a cross-section of the molded product 10 with an electron or optical microscope and confirming a trace (for example, a flow mark) indicating the direction in which the resin flowed during molding.

In the molded product 10, the fibers 11 are dispersed mainly in one of two directions. The first direction is a direction along the MD direction. The second direction is a direction along the circumference of a plurality of concentric circles having the center O as a common center when the molded product 10 is viewed from the direction orthogonal to the MD direction. The center O of the concentric circle is located at the central part in the end surface or the cross-section of the molded product 10 and corresponds to the position of the tip portion of the resin material supplied at the time of molding. The second direction is a direction in which a tangent line at an optional position on the circumference of the concentric circle extends.

The fibers 11 oriented in the first direction are distributed throughout the molded product 10. This is considered to be oriented by the supply of the resin material in the MD direction during molding. Therefore, when a force in the MD direction acts on the molded product 10, the fibers 11 along the MD direction are present in the entire molded product 10, and thus deformation of the molded product 10 due to the force (external force or stress) acting in the MD direction is suppressed. Thus, the strength of the molded product 10 in the MD direction is increased by the fibers 11 oriented in the first direction.

Next, the strength of the molded product 10 in the TD direction will be described. The second direction is a direction along tangent lines of circumferences of a plurality of concentric circles having a common center when the cross-section of the molded product is viewed along the MD direction. Therefore, a region including the center O of the molded product 10 (the central axis of the molded product 10) includes a component orthogonal to the MD direction. As described above, the orientation of the fibers 11 oriented in the second direction includes a component in the direction orthogonal to the MD direction, and the fibers 11 oriented in this manner are distributed throughout the molded product 10. Therefore, when the force in the TD direction in the region in the molded product 10 is applied, the fibers 11 existing in the direction including the component along the TD direction are present in the entire molded product 10, so that the deformation of the molded product 10 due to the force acting in the TD direction is suppressed. In this way, the strength of the molded product 10 in the TD direction is increased by the fibers 11 oriented in the second direction.

It is considered that the reason the fibers 11 are oriented in the second direction is that a part of the fibers 11 is oriented in the second direction due to behavior specific to the fibers having such a flat cross-sectional shape at the time of molding. According to Jeffery's theory, the value of the orientation parameter varies depending on the shape of the filler to be used, and the fiber is likely to be oriented in the same direction as the flow of the resin when the filler is fibrous, and in the direction perpendicular to the flow of the resin when the filler is plate-shaped. As a result, it is considered that the flow characteristics of the plate-shaped filler are substantially exhibited in the molten resin, and the orientation of the fiber as specified in an embodiment of the present invention is achieved.

As described above, the molded product 10 is less likely to be deformed by a force acting in the MD direction, and is also less likely to be deformed by a force acting in the TD direction. For this reason, the molded product 10 has no anisotropy of strength or sufficiently small anisotropy in the MD direction and the TD direction.

Anisotropy generally means that the properties change depending on the direction of molecular or fiber orientation. The anisotropy of the molded product of an embodiment of the present invention can be represented by the mechanical strength, and the magnitude of the anisotropy can be represented by the ratio of the mechanical strength in the MD direction to the mechanical strength in the TD direction. The closer the ratio is to 1, the smaller the anisotropy.

The processed article obtained by processing the molded product also has the advantages of the molded product within the range including the orientation of the fibers. For example, the processed article can be suitably produced by cutting the molded product 10 such that the center O is included in the central part of the shape of the processed article when the processed article is viewed from an optional direction. In the processed articles of these forms, the orientation of the above-described fibers in the molded product is substantially preserved.

In addition, when the processed article should exhibit the effect of relaxing anisotropy only in a specific TD direction in addition to the MD direction, the processed article may be produced using only a portion where a fiber having a component directed in the specific TD direction among the fibers oriented in the second direction is present in the molded product.

FIGS. 5 to 8 are diagrams schematically illustrating the arrangement of fibers in a comparative molded product. FIG. 5 is a diagram schematically illustrating an arrangement of fibers oriented in the first direction indicated by MD among fibers in a comparative molded product. FIG. 6 is a diagram schematically illustrating an arrangement of fibers oriented toward one point when viewed along the MD direction, indicated by TD2, among fibers in the comparative molded product. FIG. 7 is a diagram schematically illustrating the arrangement of fibers oriented in the MD direction in a cross-section orthogonal to the MD direction of the comparative molded product. FIG. 8 is a diagram schematically illustrating the arrangement of fibers oriented in the MD direction in a cross-section orthogonal to the TD2 direction of the comparative molded product.

As illustrated in FIGS. 5 to 8, a molded product 20 has fibers 21, and the fibers 21 are glass fibers having a circular cross-sectional shape. Some of the fibers 21 are oriented along the MD direction, and some of the fibers 21 are oriented radially from the center of a cross-section orthogonal to the MD direction. Such orientation of the fibers is considered to occur when the flow rate of the resin composition is sufficiently high during molding.

The strength of the molded product 20 in the MD direction is increased by the fibers 21 oriented in the MD direction among the fibers 21.

Meanwhile, with respect to the TD direction of the molded product 20, the longitudinal direction of the fibers 21 oriented in the direction along the TD direction is oriented toward the central part of the molded product when the cross-section of the molded product is viewed along the MD direction. Therefore, in the molded product 20, the fibers that contribute to suppression of deformation of the molded product 20 with respect to the force acting in the TD1 direction are unevenly distributed and limited. Therefore, the molded product 20 is sufficiently less likely to be deformed by the force acting in the MD direction, but is more likely to be deformed by the force acting in the TD1 direction than in the MD direction. Therefore, the anisotropy of strength between the MD direction and the TD1 direction in the molded product 20 is larger than that of the molded product 10. The same applies to a processed article obtained by molding and processing the molded product 20 as long as the orientation of the fibers is maintained.

As described above, in an embodiment of the present invention, although the cross-sectional shape of the fiber is not limited, for example, by using the fiber having a flat cross-sectional shape, the specific orientation of the fiber as described above is achieved, and the anisotropy of the mechanical strength in the MD direction and the TD direction of the molded product is relaxed. More specifically, in an embodiment of the present invention, anisotropy of mechanical strength between the MD direction and an optional TD direction with respect to the MD direction is relaxed. There is no report that the anisotropy of mechanical strength between the MD direction and the optional TD direction is relaxed by adding a fiber having a flat cross-sectional shape to the molded product having a three-dimensional shape having such a three-dimensional spread.

The molded product according to an embodiment of the present invention has small anisotropy of mechanical strength in the MD direction and the TD direction as described above. Therefore, when used as a downhole tool component or at the time of processing for producing the component, the need for design adjustment due to the anisotropy of mechanical strength is reduced.

Summary

As is clear from the above description, according to an embodiment of the present invention, there is a molded product containing a glycolic acid polymer and a plurality of fibers, wherein the fibers include the fibers oriented in a first direction and the fibers oriented in a second direction along a tangent line to circumferences of a plurality of concentric circles having a common center in a cross-section orthogonal to the first direction, and in the concentric circle, a ratio of the number of the fibers oriented in the second direction to the number of the fibers oriented in the first direction is from 0.2 to 5.0. Here, the first direction is a feeding direction of the resin material at the time of molding the molded product. In addition, the processed article according to an embodiment of the present invention is a processed article produced by processing the molded product in an embodiment of the present invention. According to an embodiment of the present invention, it is possible to provide a molded product having small anisotropy of strength in the MD direction and the TD direction and a processed article thereof.

In an embodiment of the present invention, the ratio of the sum of the number of fibers oriented in the first direction and the number of fibers oriented in the second direction to the total number of fibers may be 0.5 or more. This configuration is more effective from the viewpoint of enhancing the effect of relaxing the anisotropy of strength in the MD direction and the TD direction.

In an embodiment of the present invention, the shape of the molded product may be a cylinder, the first direction may be a direction along a central axis of the cylinder, and the concentric circles may have a common center located at a central part of a cross-section of the cylinder. This configuration is more effective from the viewpoint of enhancing the effect of relaxing the anisotropy of strength in the MD direction and the TD direction.

The processed article may be a downhole tool component. In addition to having sufficient biodegradability and mechanical strength, the molded product having relaxed anisotropy of strength is suitable as a downhole tool component or a material therefor.

The present invention is not limited to each embodiment described above, and may be variously altered within the scope indicated in the claims. Embodiments obtained by appropriately combining technical means disclosed in different embodiments are also included in the technical scope of the present invention.

EXAMPLES

Example 1

A material composition (compound) containing 70 parts by mass of PGA and 30 parts by mass of glass fibers (FF) having a flat cross-sectional shape was prepared.

As PGA, one having a weight-average molecular weight of 200000 available from KUREHA CORPORATION was used.

As FF, chopped strands having a modified cross-section (CSG 3PA-830, fiber length 3 mm, major axis 28 $\mu$m and minor axis 7 $\mu$m in fiber cross-section, a variant ratio of the fiber cross-section (major axis/minor axis) 4) available from NITTO BOSEKI CO., LTD. were used.

The compound was extrusion-molded using a twin-screw extruder to produce composite pellets containing PGA and FF in a weight ratio of 70:30.

The extrusion molding was performed under the conditions that the composite pellets were supplied to a hopper of a single screw extruder of L/D=28, melt-kneaded at a cylinder temperature of 260° C., extruded into a mold of $\varphi$100 mm with an extrusion die outlet temperature of 260° C., and cooled and solidified with a cooling mold temperature set to 50° C. The extrusion rate was approximately 17 mm/10 minutes.

By pressurizing the solidification- and extrusion-molded product that was solidified in the flow path of the forming die by passing the solidification- and extrusion-molded product in between upper rolls and lower rolls, expansion of the solidification- and extrusion-molded product were suppressed by adjusting the external pressure (back pressure) of the forming die to be 30 kN. With this method, a round bar-shaped molded product with a diameter of 100 mm and a length of 500 mm was obtained.

The produced molded product was cut by cutting at a width of about 5 mm, and a cube of 5 mm square was cut out by cutting at a position 26 mm away from the center of the circular cut surface such that a line passing through the center of two opposing sides of the same surface passed through the center of the circular cut surface. Then, the cube was annealed at 120° C. for 1 hour to obtain a processed article 1 by cutting the molded product.

The molded product of the present example has a round bar shape, that is, a cylinder. The MD direction in the molded product (processed article) is a direction along the central axis of the cylinder. The TD1 direction is a direction in which a tangent line to a concentric circle having a common center located at a central part of a cross-section of the cylinder.

Here, FIG. 9 is a diagram for explaining the orientation of the processed article 1 with respect to the molded product. The cube in FIG. 9 has a pair of side surfaces orthogonal to the MD direction and two pairs of side surfaces parallel to the MD direction. The positional relationship between two pairs of side surfaces parallel to the MD direction is a positional relationship in which one pair of side surfaces is orthogonal to the other pair of side surfaces. An arrow A in the drawing indicates a direction viewed along the TD direction of the molded product, and an arrow B in the drawing indicates a direction viewed along the MD direction of the molded product. FIG. 10 is an electron micrograph illustrating an example of a state of fibers when the processed article 1 is viewed along the arrow A in FIG. 9. FIG. 11 is an electron micrograph illustrating an example of a state of fibers when the processed article 1 is viewed along the arrow B in FIG. 9.

In FIG. 10, a direction perpendicular to the drawing is a TD1 direction. In addition, with respect to the drawings, a vertical arrow indicates the TD2 direction, and a horizontal arrow indicates the MD direction. The fiber in FIG. 10 is observed to have a short length, that is, a large number of cross-sections. Therefore, it can be seen from FIG. 10 that fibers are oriented in the TD direction. In FIG. 11, a direction perpendicular to the drawing is the MD direction. An arrow directed obliquely upward to the right in the drawing indicates the TD1 direction, and an arrow directed obliquely upward to the left in the drawing indicates the TD2 direction. The fibers in FIG. 11 are all oriented in one oblique direction on the screen. Therefore, it can be seen from FIG. 11 that the fibers are oriented in the intersecting direction when viewed along the MD direction, that is, the TD direction.

Example 2

A molded product and a processed article 2 were prepared in the same manner as in Example 1 except for using a material composition (compound) containing glass fibers (GF) having a circular cross-sectional shape in place of FF. For GF, (CS03JAFT 562 PB 25 KI, fiber length 3.2 mm, fiber diameter 10 $\mu$m) available from Owens Corning Corporation was used.

Comparative Example 1

A molded product and a processed article C1 were produced in the same manner as in Example 2 except that the extrusion temperature was 255° C., the temperature of the cooling mold was 70° C., and the extrusion rate was 25 mm/10 minutes.

Here, FIG. 12 is a diagram for explaining the orientation of the processed article C1 with respect to the molded product. The cube in FIG. 12 has the same orientation and shape as the cube illustrated in FIG. 9. The arrow A in the drawing indicates a direction viewed along the MD direction of the molded product. FIG. 13 is an electron micrograph illustrating an example of a state of fibers when the processed article C1 is viewed along the arrow A in FIG. 12.

In FIG. 13, a direction perpendicular to the drawing is the MD direction. With respect to the drawings, a vertical arrow indicates the TD2 direction, and a horizontal arrow indicates the TD1 direction. In the fibers in FIG. 13, groups of fibers along a direction bundling to one point outside the screen are scattered. Therefore, it can be seen from FIG. 13 that fibers are oriented in a direction concentrated at one point when viewed along the MD direction, that is, in a direction radially extending from the center point (TD2 direction).

FIG. 14 is an electron micrograph illustrating an example of a state of fibers when the processed article 2 is viewed along the arrow A in FIG. 9. FIG. 15 is an electron micrograph illustrating an example of a state of fibers when the processed article 2 is viewed along the arrow B in FIG. 9. In FIG. 14, a direction perpendicular to the drawing is a TD1 direction. With respect to the drawings in FIG. 14, a vertical arrow indicates the TD2 direction, and a horizontal arrow indicates the MD direction. In FIG. 15, a direction perpendicular to the drawing is the MD direction. With respect to the drawings in FIG. 15, a vertical arrow indicates the TD2 direction, and a horizontal arrow indicates the TD1 direction. The processed article 2 contains GF, but similar to the processed article 1, many cross-sections of fibers are observed in FIG. 14, and fibers oriented in one direction in the screen are observed in FIG. 15. Therefore, in the processed article 2, it can be seen that fibers are oriented in the TD direction as in the processed article 1.

Information on the processed articles 1 and 2 and the processed article C1 is listed in Table 1. In Table 1, the fiber diameter represents an approximate diameter in the case of FF, and represents a diameter in the case of GF. "Ra" represents an aspect ratio, and the mixing ratio represents a ratio of the content of the resin to the fiber.

Furthermore, in Table 1, "$N_2/N_1$" is a ratio of the number $N_2$ of fibers oriented in the TD1 direction to the number $N_1$ of fibers oriented in the MD direction. "$N_{12}/N$" is a ratio of the sum $N_{12}$ of the number $N_1$ of the fibers oriented in the MD direction and the number $N_2$ of the fibers oriented in the TD1 direction to the total number $N$ of the fibers.

"$N_1$" is a number obtained by multiplying by 6.46 from an average value of the number of fibers substantially oriented in the MD direction (fibers in a direction of ±30° in the MD direction) in visual fields of 500 to 1000 μm square at optional three or more locations when a cross-section of the processed article taken along the MD direction is observed with an electron microscope. "$N_2$" is a number obtained by multiplying by 6.46 from an average value of the number of fibers substantially oriented in the TD1 direction (fibers in a direction of ±30° in the TD1 direction) in visual fields of 500 to 1000 μm square at optional three or more locations when a cross-section of the processed article taken along the TD1 direction is observed with an electron microscope. "6.46" is a coefficient for correcting the number of observed fibers oriented in a direction substantially parallel to the cross-section, as described above. In addition, the TD1 direction for each field of view is obtained from the concentric circles by confirming the concentric orientation of the fibers in the cross-section. "$N$" is an average value of the total number of fibers observed in each field of view in the "$N_1$" and "$N_2$" measurements.

Evaluation

Measurement of Compressive Strength of Processed Article Cut from Molded Product For each of the processed articles 1 and 2 and the processed article C1, the compressive strength in the MD direction was measured by compressing the processed article with a pair of surfaces orthogonal to the MD direction. The compressive strength was measured in the direction of TD1 of the two pairs of surfaces along the MD direction. The compressive strength was measured by applying a compressive load at a test speed 1 mm/min under the condition of 23° C. and measuring the maximum point stress when the processed article was broken.

The evaluation results are listed in Table 2. In Table 2, "$S_{MD}$" represents the compressive strength in the MD direction, "$S_{TD1}$" represents the compressive strength in the tangent line direction (TD1) of a concentric circle centered on the transverse cross-section of the molded product, and "$S_{MD}/S_{TD1}$" represents the ratio of the compressive strength in the MD direction to the compressive strength in the TD1 direction.

TABLE 2

| Processed article No. | $S_{MD}$ (MPa) | $S_{TD1}$ (MPa) | $S_{MD}/S_{TD1}$ (—) |
|---|---|---|---|
| 1 | 220 | 249 | 0.88 |
| 2 | 280 | 254 | 1.10 |
| C1 | 258 | 150 | 1.72 |

The ratio of the compressive strength in the MD direction to the compressive strength in the TD1 direction in the processed article C1 to which GF was added and which was molded at an extrusion rate of 25 mm/10 minutes was 1.72. Meanwhile, the ratio of the compressive strength in the MD direction to the compressive strength in the TD1 direction in each of the processed article 1 to which FF molded at an extrusion rate of 17 mm/10 minutes was added and the processed article 2 to which GF was added was 0.88 and 1.10. From these results, it was confirmed that the effect of relaxing the anisotropy can be achieved by decreasing the extrusion rate.

INDUSTRIAL APPLICABILITY

In the present invention, anisotropy of the mechanical strength of a molded product serving as a material of a downhole tool component is suppressed. Therefore, the present invention is expected to contribute to an increase in the life of the component and an improvement in productivity.

REFERENCE SIGNS LIST

10, 20 Molded product
11, 21 Fiber

The invention claimed is:

1. A molded product comprising a glycolic acid polymer and a plurality of fibers, the plurality of fibers including the fibers oriented in a first direction and the fibers oriented in a second direction, the second direction being along a tangent line to circumferences of a plurality of concentric circles having a common center in a cross-section orthogonal to the first direction,

TABLE 1

| Processed article No. | Resin | Fiber Type | Fiber diameter (μm) | Ra (—) | $N_2/N_1$ (—) | $N_{12}/N$ (—) | Mixing ratio (—) |
|---|---|---|---|---|---|---|---|
| 1 | PGA | FF | 15 | 15 | 0.80 | 0.99 | 70/30 |
| 2 | PGA | GF | 10 | 24 | 0.40 | 0.99 | 70/30 |
| C1 | PGA | GF | 10 | 24 | 0.05 | 0.36 | 70/30 | wherein in the concentric circles, a ratio of the number of the fibers oriented in the second direction to the number of the fibers oriented in the first direction is 0.2 to 5.0, and the first direction is a feeding direction of the resin material when molding the molded product.

2. The molded product according to claim 1, wherein a ratio of a sum of the number of fibers oriented in the first direction and the number of fibers oriented in the second direction to the total number of fibers is 0.5 or more.

3. The molded product according to claim 1, wherein the molded product is a cylinder, the first direction is a direction along a central axis of the cylinder, and the concentric circles have a common center located at a central part of a cross-section of the cylinder.

4. A processed article produced by processing the molded product described in claim 1.

5. The processed article according to claim 4, which is a downhole tool component.

\* \* \* \* \*